United States Patent
Tanaka et al.

(10) Patent No.: US 11,572,674 B2
(45) Date of Patent: Feb. 7, 2023

(54) WORKING VEHICLE

(71) Applicant: HITACHI CONSTRUCTION MACHINERY CO., LTD., Tokyo (JP)

(72) Inventors: Tetsuji Tanaka, Abiko (JP); Koji Hyodo, Kasumigaura (JP); Yasunori Miyamoto, Tsuchiura (JP); Isamu Aoki, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/979,975

(22) PCT Filed: Sep. 24, 2019

(86) PCT No.: PCT/JP2019/037348
§ 371 (c)(1),
(2) Date: Sep. 11, 2020

(87) PCT Pub. No.: WO2020/067053
PCT Pub. Date: Apr. 2, 2020

(65) Prior Publication Data
US 2021/0047801 A1 Feb. 18, 2021

(30) Foreign Application Priority Data

Sep. 28, 2018 (JP) .............................. JP2018-184000

(51) Int. Cl.
*E02F 9/22* (2006.01)
*B62D 5/07* (2006.01)
(52) U.S. Cl.
CPC ............ *E02F 9/2228* (2013.01); *B62D 5/075* (2013.01); *E02F 9/225* (2013.01)
(58) Field of Classification Search
CPC .... F15B 2211/781; E02F 9/225; B62D 5/075; B62D 5/07; B62D 5/09
See application file for complete search history.

(56) References Cited

U.S. PATENT DOCUMENTS 7,464,545 B2 * 12/2008 Vigholm ................. B62D 5/07
60/452
7,891,458 B2 * 2/2011 Nakamura ............. E02F 9/225
180/422

(Continued)

FOREIGN PATENT DOCUMENTS

CN 101516715 A 8/2009
JP 60-088102 U 6/1985

(Continued)

OTHER PUBLICATIONS

International Search Report of PCT/JP2019/037348 dated Dec. 10, 2019.

*Primary Examiner* — Abi Teka
(74) *Attorney, Agent, or Firm* — Mattingly & Malur, PC

(57) ABSTRACT

Provided is a working vehicle capable of increasing lifting operation speed of a working device without increasing cost, even when provided with a circuit configuration that prioritizes a steering operation over a working device operation. A wheel loader 1 comprises a priority valve 451 configured to allow hydraulic oil discharged from a hydraulic pump 41 to flow into a steering drive circuit 43 preferentially over a working device drive circuit 44, and further comprises: an electric steering lever 30; a pair of solenoid control valves 34A, 34B configured to control a steering directional control valve 33; and a controller 5. The controller 5 is configured to control the pair of solenoid control valves 34A, 34B so as to limit operation speed of a steering 3 when determining that an engine 40 is in a low idle state and a lift arm 21 is performing a lifting operation.

4 Claims, 9 Drawing Sheets

(56) References Cited

U.S. PATENT DOCUMENTS

| | | | | |
|---|---|---|---|---|
| 8,756,930 B2 * | 6/2014 | Johnson | ................ | E02F 9/2242 60/430 |
| 2015/0275932 A1 | 10/2015 | Vigholm et al. | | |
| 2017/0274930 A1 * | 9/2017 | Zhang | ................... | E02F 9/2203 |

FOREIGN PATENT DOCUMENTS

| | | | |
|---|---|---|---|
| JP | 61-221425 | A | 10/1986 |
| JP | 11-115780 | A | 4/1999 |
| JP | 2000-190858 | A | 7/2000 |
| JP | 2005-535487 | A | 11/2005 |
| JP | 2006-290236 | A | 10/2006 |
| JP | 2012-086617 | A | 5/2012 |
| JP | 5048068 | B2 | 10/2012 |
| JP | 5809549 | B2 | 11/2015 |
| WO | 2008/075568 | A1 | 6/2008 |
| WO | 2013/145334 | A1 | 10/2013 |

* cited by examiner

WORKING VEHICLE

TECHNICAL FIELD

The present invention relates to a working vehicle equipped with a steering for steering wheels.

BACKGROUND ART

As a wheel type working vehicle equipped with a steering, there has been known, for example, a wheel loader and a forklift which perform loading work. In these working vehicles, it is necessary to supply hydraulic oil to each of a steering actuator for driving the steering and a loading actuator for driving a working device used for loading work.

For example, Patent Literature 1 discloses a wheel loader in which a steering actuator and a loading actuator are connected in parallel to a common hydraulic pump, and each of the actuators are driven by hydraulic oil discharged from the common hydraulic pump. The wheel loader according to Patent Literature 1 includes a circuit configuration which allows the hydraulic oil discharged from the hydraulic pump to flow to the steering actuator when the steering changes from a non-operating state to an operating state, in other words, when the steering is operated, regardless of an operation of an operation tool for operating a working device. With this configuration, the steering actuator is activated preferentially over the loading actuator.

CITATION LIST

Patent Literature

[Patent Literature 1] JP 5809549 B

SUMMARY OF INVENTION

Technical Problem

However, when a steering operation and a lifting operation of the working device are performed simultaneously, in the wheel loader according to Patent Literature 1, the hydraulic oil from the hydraulic pump basically flows to the steering actuator preferentially over the loading actuator.

Accordingly, in particular, when a discharge flow rate of the hydraulic pump is so small that a maximum amount of oil required for activating the steering actuator cannot be supplied while the engine is driven at low rotational speed such as in a low idle state, it is difficult to secure a flow rate of the hydraulic oil required for activating the loading actuator. As a result, speed of the lifting operation of the working device becomes slow, which may lead a possibility of decrease in work efficiency.

In this connection, it may be considered that a hydraulic pump for steering which supplies the hydraulic oil to the steering actuator and a hydraulic pump for loading which supplies the hydraulic oil to the loading actuator are respectively provided. However, in such a case, problems such as increase in cost and increase in size of a vehicle body due to increase in the number of parts occur.

In view of the above, an object of the present invention is to provide a working vehicle capable of increasing lifting operation speed of a working device without increasing cost, even when provided with a circuit configuration that prioritizes an operation of a steering over an operation of a working device.

Solution to Problem

In order to achieve the object above, the present invention provides a working vehicle comprising: an engine; a working device provided in a front portion of a vehicle body and rotatable in a vertical direction; a working device cylinder configured to activate the working device; a working device operation device configured to operate the working device; a steering configured to steer wheels; a steering cylinder configured to activate the steering; a hydraulic pump configured to be driven by the engine and supply hydraulic oil to each of the working device cylinder and the steering cylinder; a steering directional control valve configured to control a flow of the hydraulic oil supplied to the steering cylinder; and a priority valve configured to allow the hydraulic oil discharged from the hydraulic pump to the steering cylinder preferentially over the working device cylinder, wherein the working vehicle further comprises: an electric steering operation device configured to operate the steering; a solenoid control valve configured to output an output current in accordance with an operation amount of the steering operation device to the steering directional control valve so as to control the steering directional control valve; a rotational speed sensor configured to detect rotational speed of the engine; an operation state sensor configured to detect an operation state of the working device operation device; and a controller configured to control the solenoid control valve, and wherein the controller is further configured to: based on the rotational speed of the engine detected by the rotational speed sensor, determine whether the engine is driven in a low idle state in which the hydraulic pump can supply the hydraulic oil to each of the steering cylinder and the working device cylinder at minimum; based on the operation state of the working device operation device detected by the operation state sensor, determine whether the working device is performing a lifting operation; and in a case of determining that the engine is driven in the low idle state and the working device is performing the lifting operation, limit the output current to be output by the solenoid control valve so that the operation speed of the steering is limited.

Advantageous Effects of Invention

According to the present invention, it is possible to increase lifting operation speed of a working device without increasing cost, even when provided with a circuit configuration that prioritizes an operation of a steering over an operation of a working device. The problems, configurations, and effects other than those described above will be clarified by explanation of the embodiment below.

BRIEF DESCRIPTION OF DRAWINGS

FIG. 6A illustrates a characteristic for left steering, and FIG. 6B illustrates a characteristic for right steering.

FIG. 7A illustrates a characteristic for left steering, and FIG. 7B illustrates a characteristic for right steering.

FIG. 9A illustrates a characteristic for left steering, and FIG. 9B illustrates a characteristic for right steering.

DESCRIPTION OF EMBODIMENTS

Hereinafter, as an aspect of a working vehicle according to an embodiment of the present invention, a wheel loader will be described.
(Overall Configuration of Wheel Loader 1)

First, an overall configuration and operations of a wheel loader 1 will be described with reference to FIG. 1 and FIG. 2.

Figure 1:
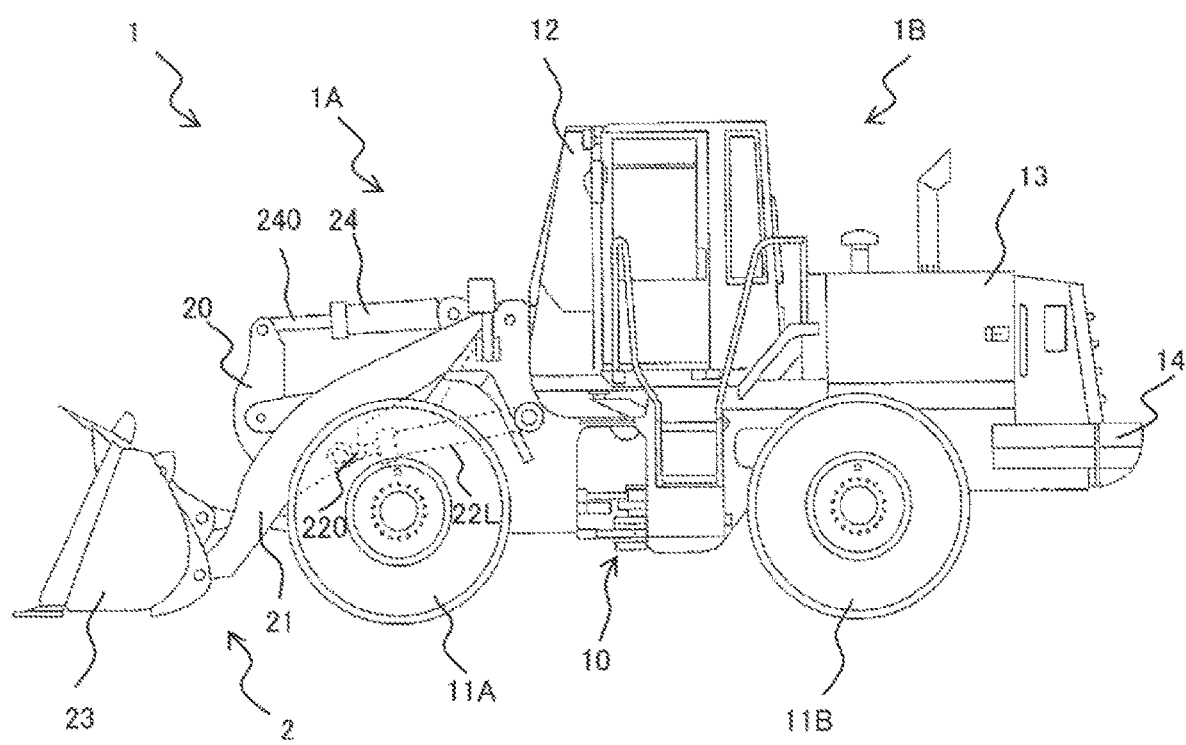
FIG. 1 is a side view illustrating appearance of a wheel loader according to an embodiment of the present invention.

FIG. 1 is a side view illustrating appearance of the wheel loader 1 according to an embodiment of the present invention.

The wheel loader 1 is provided with a vehicle body which includes a front frame 1A and a rear frame 1B, and a working device 2 which is disposed on a front portion of the vehicle body. The wheel loader 1 is an articulated type working vehicle which is swiveled on a central portion of the vehicle body and steered thereby. The front frame 1A and the rear frame 1B are connected to each other by a center joint 10 to swivel in the left and right direction so that the front frame 1A is bent in the left and right direction with respect to the rear frame 1B.

A pair of left and right front wheels 11A is provided on the front frame 1A, and a pair of left and right rear wheels 11B is provided on the rear frame 1B. The pair of left and right front wheels 11A and the pair of rear wheels 11B are steered by a steering 3 (see FIG. 3 and FIG. 4), thereby switching a traveling direction of the wheel loader 1 to the right and left direction. FIG. 1 illustrates only the left front wheel 11A of the pair of left and right front wheels 11A and the left rear wheel 11B of the pair of left and right rear wheels 11B. In the following, there are cases where the "front wheels 11A and rear wheels 11B" are collectively referred to as "wheels 11A, 11B".

The rear frame 1B is provided with an operator's cab 12 to be boarded by an operator, a mechanical room 13 in which devices such as an engine, a controller, a hydraulic pump, etc. are accommodated, and a counterweight 14 for maintaining balance between the vehicle body and the working device 2 to prevent the vehicle body from tilting. On the rear frame 1B, the operator's cab 12 is disposed on the front, the counterweight 14 is disposed on the rear, and the mechanical room 13 is disposed between the operator's cab and the counterweight 14, respectively.

The working device 2 includes a lift arm 21 attached to the front frame 1A, a pair of lift arm cylinders 22L, 22R configured to rotate the lift arm 21 in the vertical direction with respect to the front frame 1A, a bucket 23 attached to the front end portion of the lift arm 21, a bucket cylinder 24 configured to rotate the bucket 23 in the vertical direction with respect to the lift arm 21, a bell crank 20 that is rotatably connected to the lift arm 21 and constitutes a link mechanism between the bucket 23 and the bucket cylinder 24, and a plurality of pipelines (not illustrated) for leading pressure oil to the pair of lift arm cylinders 22L, 22R and the bucket cylinder 24. FIG. 1 illustrates only the lift arm 22L, which is disposed on the left side, of the pair of lift arm cylinders 22L, 22R by indicating it with a broken line.

The lift arm 21 is rotated in the upward direction by extension of a rod 220 of each of the pair of lift arm cylinders 22L, 22R, and rotated in the downward direction by contraction of each rod 220. The bucket 23 is tilted (rotated in the upward direction with respect to the lift arm 21) by extension of a rod 240 of the bucket cylinder 24, and dumped (rotated in the downward direction with respect to the lift arm 21) by contraction of the rod 240. The pair of lift arm cylinders 22L, 22R and the bucket cylinder 24 correspond to a working device cylinder for operating the working device 2.

The wheel loader 1 is a working vehicle configured to perform loading work by excavating such as earth and sand and minerals in a strip mine, etc., and loading them into such as a dump truck. In the following, as a major example of work performed by the wheel loader 1, excavation work and loading work will be described with reference to FIG. 2.

Figure 2:
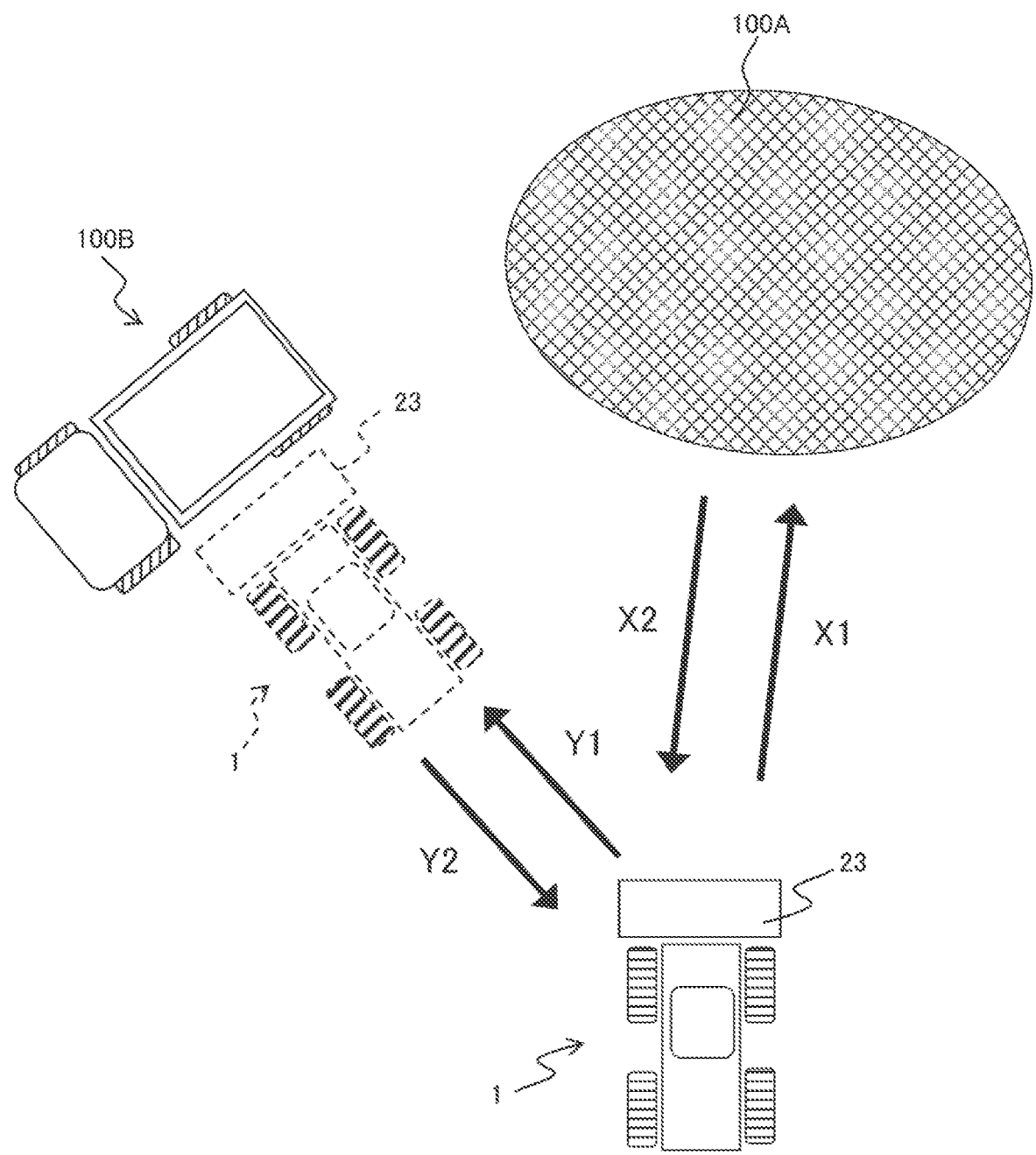
FIG. 2 explains V-shape loading performed by a wheel loader.

FIG. 2 explains V-shape loading performed by the wheel loader 1.

First, the wheel loader 1 moves forward toward the natural ground 100A which is an object to be excavated (arrow X1 illustrated in FIG. 2), and performs excavation work by tilting the bucket 23 in a state of making the bucket 23 thrust into the natural ground 100A. When completing the excavation work, the wheel loader 1 temporarily moves backward to the original position in a state where an excavated object such as the excavated earth and sand and minerals is loaded on the bucket 23 (arrow X2 illustrated in FIG. 2).

Subsequently, the wheel loader 1 moves forward toward a dump truck 100B while operating the lift arm 21 in the upward direction (arrow Y1 illustrated in FIG. 2), and loads the excavated object onto the dump truck 100B by dumping the bucket 23 in front of the dump truck 100B. FIG. 2 illustrates the wheel loader 1 in a state of being stopped in front of the dump truck 100B by indicating it with a broken line.

When completing the loading work with respect to the dump truck 100B, the wheel loader 1 moves backward to the original position in a state where no excavated object is loaded on the bucket 23 (arrow Y2 illustrated in FIG. 2). In this manner, the wheel loader 1 travels reciprocally along V-shape between the natural ground 100A and the dump truck 100B to perform excavation work and loading work, which is called "V-shape loading".

For example, when the wheel loader 1 performs the excavation work and the loading work in a narrow and limited work site, since the distance between the natural ground 100A and the dump truck 100B is short, an operator has to perform a lifting operation of the working device 2 while switching a steering direction but without increasing rotational speed of the engine.
(Drive System of Working Device 2 and Steering 3)

Next, a drive system of the working device 2 and the steering 3 will be described with reference to FIG. 3 and FIG. 4, respectively.

Figure 3:
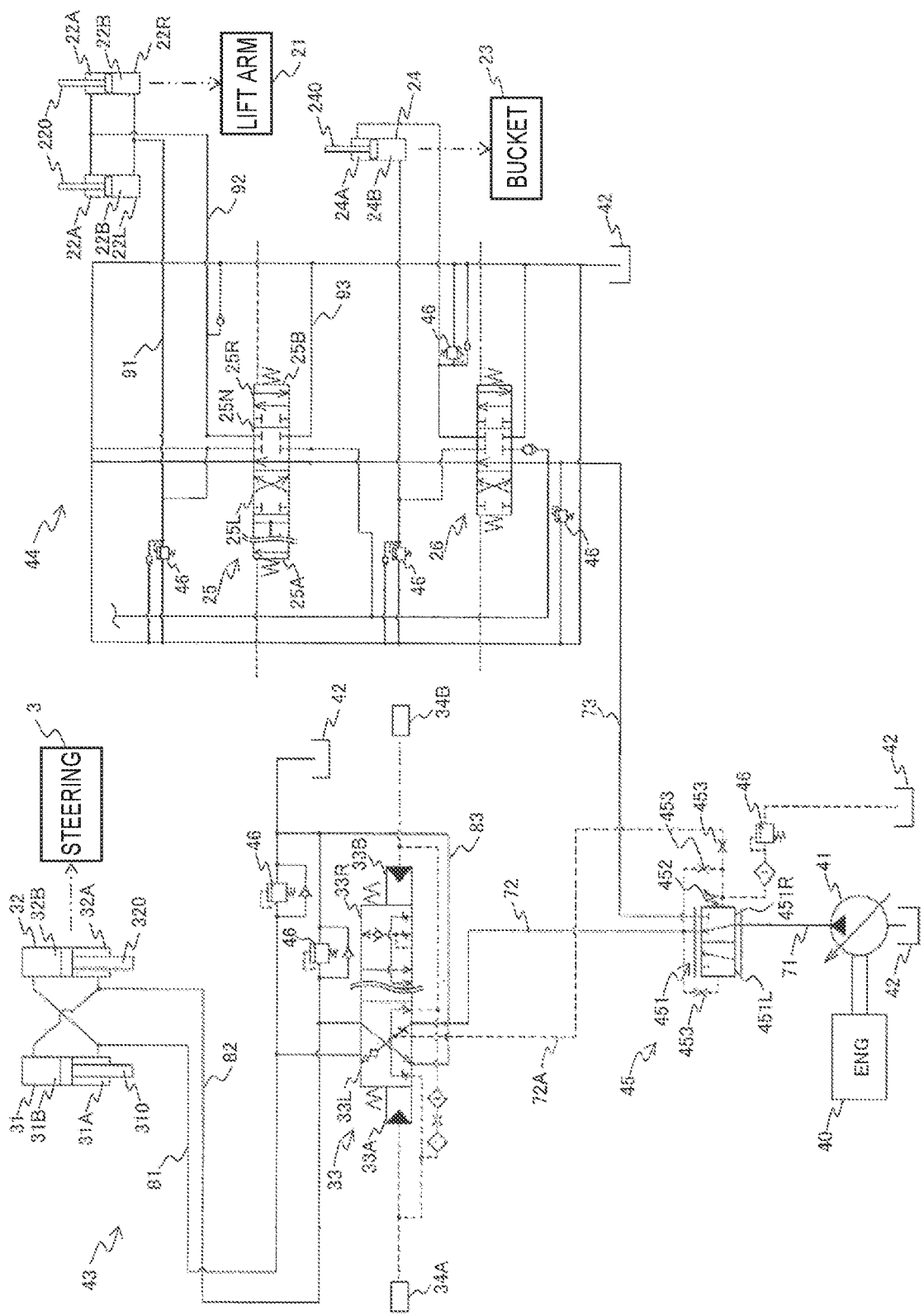
FIG. 3 is a hydraulic circuit diagram according to drive of a working device and a steering.
Figure 4:
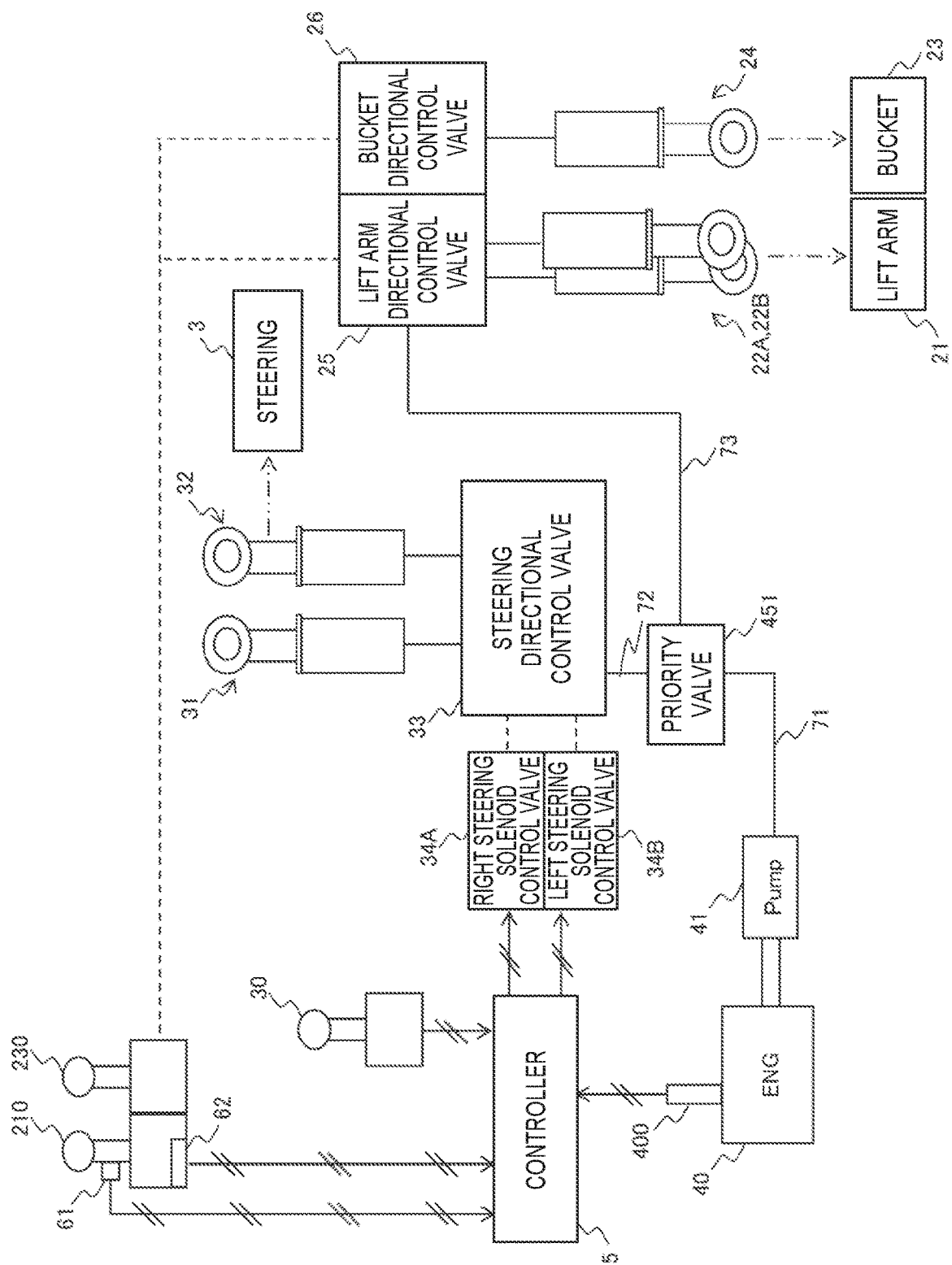
FIG. 4 is a schematic diagram illustrating a system configuration according to drive of a working device and a steering.

FIG. 3 is a hydraulic circuit diagram according to drive of the working device 2 and the steering 3. FIG. 4 is a schematic diagram illustrating a system configuration according to the drive of the working device 2 and the steering 3.

The hydraulic circuit according to drive of the working device 2 and the steering 3 includes a hydraulic pump 41 driven by an engine 40, a hydraulic oil tank 42 that stores hydraulic oil, a steering drive circuit 43 configured to drive the steering 3, a working device drive circuit 44 configured to drive the working device 2, and a priority circuit 45 configured to allow the hydraulic oil discharged from the hydraulic pump 41 to flow to the steering drive circuit 43 preferentially over the working device drive circuit 44.

The hydraulic pump 41 is a variable displacement hydraulic pump, which is configured to be rotated by drive force of the engine 40 and suck and compress hydraulic oil from the hydraulic oil tank 42 to discharge the hydraulic oil. The priority circuit 45 is connected to the discharge side of the hydraulic pump 41. The steering drive circuit 43 and the working device drive circuit 44 are connected in parallel at the downstream side of the priority circuit 45. With this configuration, the hydraulic oil (pressure oil) discharged from the hydraulic pump 41 is supplied to both the steering drive circuit 43 and the working device drive circuit 44 through the priority circuit 45.

The steering drive circuit 43 includes a steering lever 30 for operating the steering 3, a pair of steering cylinders 31, 32 configured to activate the steering 3, a steering directional control valve 33 configured to control a flow of the hydraulic oil (direction and flow rate) supplied to the pair of steering cylinders 31, 32, respectively, and a pair of solenoid control valves 34A, 34B configured to output an output current corresponding to an operation amount of the steering lever 30 to the steering directional control valve 33 so as to control the steering directional control valve 33.

In the following, among a pair of steering cylinders 31, 32, one of the steering cylinders is referred to as a left steering cylinder 31 (illustrated on the left side in FIG. 3), and the other one of the steering cylinders is referred to as a right steering cylinder 32 (illustrated on the right side in FIG. 3).

The steering lever 30 is an electric operation lever provided in the driver's cab 12. A steering direction of the wheels 11A, 11B is instructed by an operation direction (tilt direction) of the steering lever 30, and angular velocity of the steering 3 is instructed by an operation angle (tilt angle). When the operator operates the steering lever 30, the operation direction and the operation angle (operation amount) is input to the controller 5 as an electric signal. In the present embodiment, the steering lever 30 is used as an electric steering operation device, meanwhile, the present invention is not limited thereto, but for example, a steering handle that can be rotated may be adopted.

The pair of steering cylinders 31, 32 activates the steering 3 by extension and contraction of each rod 310, 320 thereof. Specifically, the pair of steering cylinders 31, 32 activates the steering 3 in one direction when the rod 310 of the left steering cylinder 31 contracts and the rod 320 of the right steering cylinder 32 extends, while activating the steering 3 in the other direction when the rod 310 of the left steering cylinder 31 extends and the rod 320 of the right steering cylinder 32 contracts. In the present embodiment, in a case of being activated in one direction, the steering steers the wheels 11A, 11B in the right direction, while in a case of being activated in the other direction, the steering 3 steers the wheels 11A, 11B in the left direction.

The steering directional control valve 33 has a first switch position 33L for contracting the rod 310 of the left steering cylinder 31 and extending the rod 320 of the right steering cylinder 32, and a second switch position 33R for extending the rod 310 of the left steering cylinder 31 and contracting the rod 320 of the right steering cylinder 32.

The first switch position 33L and the second switch position 33R are switched when the internal spool strokes in accordance with the magnitude of pilot pressure acting on a pair of pressure receiving chambers 33A, 33B, respectively. In the present embodiment, the traveling direction of the wheel loader 1 is switched to the right when the steering directional control valve 33 is switched to the first switch position 33L while being switched to the left when the steering directional control valve 33 is switched to the second switch position 33R. That is, the first switch position 33L is a switch position for right steering, and the second switch position 33R is a switch position for left steering.

Each of the pair of solenoid control valves 34A, 34B is a solenoid proportional pilot valve, which is configured to generate pilot pressure proportional to an electric signal (output current) output from the controller 5. First pilot pressure P1 generated by the solenoid control valve 34A, which is one of the solenoid control valves 34A, 34B, acts on the pressure receiving chamber 33A which is one of the pressure receiving chambers 33A, 33B of the steering directional control valve 33, and second pilot pressure P2 generated by the other solenoid control valve 34B acts on the other pressure receiving chamber 33B of the steering directional control valve 33, respectively.

When the first pilot pressure P1 is greater than the second pilot pressure P2 (P1>P2), the steering directional control valve 33 is switched to the first switch position 33L. Conversely, when the second pilot pressure P2 is greater than the first pilot pressure P1 (P2>P1), the steering directional control valve 33 is switched to the second switch position 33R. With this configuration, the pair of solenoid control valves 34A, 34B controls a stroke amount of the internal spool of the steering directional control valve 33.

In the following, one of the pair of solenoid control valves 34A, 34B is referred to as a right steering solenoid control valve 34A, and the other one of the pair of solenoid control valves 34A, 34B is referred to as a left steering solenoid control valve 34B.

The working device drive circuit 44 includes a lift arm operation lever 210 for operating the lift arm 21, a bucket operation lever 230 for operating the bucket 23, the pair of lift arm cylinders 22L, 22R, the bucket cylinder 24, a lift arm directional control valve 25 configured to control a flow of the hydraulic oil supplied to each of the pair of lift arm cylinders 22L, 22R, and a bucket directional control valve 26 configured to control a flow of the hydraulic oil supplied to the bucket cylinder 24.

The lift arm operation lever 210 is a pilot type operation lever provided in the operator's cab 12. A motion direction (upwardly or downwardly) of the lift arm 21 is instructed by an operation direction, and motion speed of the lift arm 21 is instructed by an operation angle (operation amount). When the operator operates the lift arm operation lever 210, pilot pressure corresponding to the operation angle is generated and acts on a pair of pressure receiving chambers 25A, 25B of the lift arm directional control valve 25.

The operation angle of the lift arm operation lever 210 is detected by an angle sensor 61, and the pilot pressure generated in accordance with the operation angle of the lift arm operation lever 210 is detected by the pilot pressure sensor 62, respectively, which are then input to the controller 5. The angle sensor 61 and the pilot pressure sensor 62 correspond to an operation state sensor for detecting an operation state of the lift arm 21 (working device 2). In this connection, the wheel loader 1 does not necessarily include both the angle sensor 61 and the pilot pressure sensor 62 as an operation state sensor, as long as including at least one of the angle sensor 61 and the pilot pressure sensor 62.

The lift arm directional control valve 25 includes a first switch position 25L for contracting each rod 220 of the pair of lift arm cylinders 22L, 22R, a neutral position 25N for returning the hydraulic oil discharged from the hydraulic pump 41 to the hydraulic oil tank 42 by communicating the hydraulic pump 41 and the hydraulic oil tank 42, and a second switch position 25R for extending each rod 220 of the pair of lift arm cylinders 22L, 22R. The first switch position 25L, the neutral position 25N, and the second switch position 25R are switched when the internal spool strokes in accordance with the magnitude of the pilot pressure acting on the pair of pressure receiving chambers 25A, 25B, respectively.

As described above, an operation of the lift arm 21 is performed by allowing the pilot pressure generated in accordance with the operation angle of the lift arm operation lever 210 to act on the lift arm directional control valve 25, and then adjusting a flow rate of the hydraulic oil flowing into the pair of lift arm cylinders 22L, 22R. Similarly, an operation of the bucket 23 is performed by allowing the pilot pressure generated in accordance with the operation angle of the bucket operation lever 230 to act on the bucket directional control valve 26, and then adjusting a flow rate of the hydraulic oil flowing into the bucket cylinder 24.

The lift arm operation lever 210 and the bucket operation lever 230 correspond to a working device operation device for operating the working device 2. In the present embodiment, a pilot type operation lever is used as a working device operation device. Meanwhile, the present invention is not limited thereto, but for example, an electric operation lever may be adopted. In a case of using the electric operation lever, a current corresponding to the operation angle is generated.

The priority circuit 45 includes a priority valve 451 configured to allow the hydraulic oil discharged from the hydraulic pump 41 to flow into the pair of steering cylinders 31, 32 preferentially over the pair of lift arm cylinders 22L, 22R and the bucket cylinder 23.

The priority valve 451 is a pilot type proportional switch valve, and includes a first switch position 451L for allowing the hydraulic oil discharged from the hydraulic pump 41 to flow into the working device drive circuit 44, and a second switch position 451R for allowing the hydraulic oil discharged from the hydraulic pump 41 to flow into the steering drive circuit 43. The first switch position 451L and the second switch position 451R are switched when the pilot pressure acts on a pair of pressure receiving chambers 451A, 451B.

The priority valve 451 includes a spring member 452 that is biased against the pilot pressure acting on the pressure receiving chamber 451A which is one of the pair of pressure receiving chambers 451A, 451B. The priority valve 451 adjusts an opening degree at the first switch position 451L and an opening degree at the second switch position 451R based on balance of force between the pilot pressure acting on the pair of pressure receiving chambers 451A, 451B and biasing force of the spring member 452.

Here, it is assumed that the pilot pressure acting on the pressure receiving chamber 451A is a third pilot pressure P3 and the pilot pressure acting on the pressure receiving chamber 451B which is the other one of the pair of pressure receiving chambers 451A, 451B is a fourth pilot pressure P4. In order to completely switch the priority valve 451 from the second switch position 451R to the first switch position 451L, the third pilot pressure P3 needs to be greater than the fourth pilot pressure P4 and the biasing force F of the spring member 452 (P3>P4+F). Accordingly, the priority valve 451 is more easily switched to the second switch position 451R than to the first switch position 451L, and has a structure in which the hydraulic oil discharged from the hydraulic pump 41 is allowed to flow to the pair of steering cylinders 31, 32 preferentially over the pair of lift arm cylinders 22L, 22R and the bucket cylinder 24.

In the present embodiment, the steering drive circuit 43, the working device drive circuit 44, and the priority circuit 45, respectively, are provided with a plurality of relief valves 46 configured to relieve excess pressure generated in the circuit to the hydraulic oil tank 42.

Next, a connection configuration between the devices provided in each of the steering drive circuit 43, the working device drive circuit 44, and the priority circuit 45, and a flow of the hydraulic oil therein will be described in detail.

As illustrated in FIG. 3, the priority valve 451 is connected to the hydraulic pump 41 through a first main pipeline 71, connected to the steering directional control valve 33 through a second main pipeline 72, and connected to the lift arm directional control valve 25 through a third main pipeline 73.

The second main pipeline 72 is connected to a pilot pipeline 72A that leads the hydraulic oil to each of the pair of pressure receiving chambers 451A, 451B of the priority valve 451. With this configuration, a part of the hydraulic oil led to the second main pipeline 72 is led to the pilot pipeline 72A and acts, as the pilot pressure, on each of the pair of pressure receiving chambers 451A, 451B of the priority valve 451. In the present embodiment, the pilot pipeline 72A is provided with a plurality of throttles 453.

The steering directional control valve 33 is connected to a rod chamber 31A of the left steering cylinder 31 and a bottom chamber 32B of the right steering cylinder 32 through a first steering pipeline 81, connected to a bottom chamber 31B of the left steering cylinder 31 and a rod chamber 32A of the right steering cylinder 32 through a second steering pipeline 82, and connected to the hydraulic oil tank 42 through a third steering pipeline 83.

When the operator operates the steering lever 30 in order to switch the traveling direction of the wheel loader 1 to the right, the priority valve 451 is switched to the second switch position 451R, whereby the first main pipeline 71 and the second main pipeline 72 are communicated to each other. Then, the steering directional control valve 33 is switched to the first switch position 33L, whereby the second main pipeline 72 and the first steering pipeline 81 are communicated to each other as well as the second steering pipeline 82 and the third steering pipeline 83 are communicated to each other.

Accordingly, among the hydraulic oil discharged from the hydraulic pump 41 and led to the first main pipeline 71, a flow rate in accordance with the opening degree at the second switch position 451R of the priority valve 451 flows into the rod chamber 31A of the left steering cylinder 31 and the bottom chamber 32B of the right steering cylinder 32 through the second main pipeline 72 and the first steering pipeline 81, while the hydraulic oil discharged from the bottom chamber 31B of the left steering cylinder 31 and the rod chamber 32A of the right steering cylinder 32 flows out into the hydraulic oil tank 42 through the second steering pipeline 82 and the third steering pipeline 83. As a result, the rod 310 of the left steering cylinder 31 contracts and the rod 320 of the right steering cylinder 32 extends, whereby the traveling direction of the wheel loader 1 is switched to the right.

On the other hand, when the operator operates the steering lever 30 in order to switch the traveling direction of the wheel loader 1 to the left, the priority valve 451 is switched to the second switch position 451R, whereby the first main pipeline 71 and the second main pipeline 72 are communicated to each other. Then, the steering directional control valve 33 is switched to the second switch position 33R, whereby the second main pipeline 72 and the second steering pipeline 82 are communicated to each other as well as the first steering pipeline 81 and the third steering pipeline 83 are communicated to each other.

Accordingly, among the hydraulic oil discharged from the hydraulic pump 41 and led to the first main pipeline 71, a flow rate in accordance with the opening degree at the second switch position 451R of the priority valve 451 flows into the bottom chamber 31B of the left steering cylinder 31 and the rod chamber 32A of the right steering cylinder 32 through the second main pipeline 72 and the second steering pipeline 82, while the hydraulic oil discharged from the rod chamber 31A of the left steering cylinder 31 and the bottom chamber 32B of the right steering cylinder 32 flows out to the hydraulic oil tank 42 through the first steering pipeline 81 and the third steering pipeline 83. As a result, the rod 310 of the left steering cylinder 31 extends and the rod 320 of the right steering cylinder 32 contracts, whereby the traveling direction of the wheel loader 1 is switched to the left.

The lift arm directional control valve 25 is connected to each bottom chamber 22B of the pair of lift arm cylinders 22L, 22R through a first working device pipeline 91, connected to each rod chamber 22A of the pair of lift arm cylinders 22L, 22R through a second working device pipeline 92, and connected to the hydraulic oil tank 42 through a third working device pipeline 93.

When the operator operates the lift arm operation lever 210 in order to move the lift arm 21 in the upward direction, the priority valve 451 is switched to the first switch position 451L, whereby the first main pipeline 71 and the third main pipeline 73 are communicated to each other. Then, the lift arm directional control valve 25 is switched to the second switch position 25R, whereby the third main pipeline 73 and the first working device pipeline 91 are communicated to each other as well as the second working device pipeline 92 and the third working device pipeline 93 are communicated to each other.

Accordingly, among the hydraulic oil discharged from the hydraulic pump 41 and led to the first main pipeline 71, a flow rate in accordance with the opening degree at the first switch position 451L of the priority valve 451 flows into each bottom chamber 22B through the third main pipeline 73 and the first working device pipeline 91, while the hydraulic oil discharged from each rod chamber 22A flows out to the hydraulic oil tank 42 through the second working device pipeline 92 and the third working device pipeline 93. As a result, each rod 200 of the pair of lift arm cylinders 22L, 22R extends, whereby the lift arm 21 is driven in the upward direction.

On the other hand, when the operator operates the lift arm operation lever 210 in order to move the lift arm 21 in the downward direction, the priority valve 451 is switched to the first switch position 451L, whereby the first main pipeline 71 and the third main pipeline 73 are communicated to each other. Then, the lift arm directional control valve 25 is switched to the first switch position 25L, whereby the third main pipeline 73 and the second working device pipeline 92 are communicated to each other as well as the first working device pipeline 91 and the third working device pipeline 93 are communicated to each other.

Accordingly, among the hydraulic oil discharged from the hydraulic pump 41 and led to the first main pipeline 71, a flow rate in accordance with the opening degree at the first switch position 451L of the priority valve 451 flows into each rod chamber 22A through the third main pipeline 73 and the second working device pipeline 92, while the hydraulic oil discharged from each bottom chamber 22B flows out to the hydraulic oil tank 42 through the first working device pipeline 91 and the third working device pipeline 93. As a result, each rod 220 of the pair of lift arm cylinders 22L, 22R contracts, whereby the lift arm 21 is driven in the downward direction.

Since a connection configuration between the devices and a flow of the hydraulic oil according to the bucket 23 are the same as those according to the lift arm 21, specific explanation thereof will be omitted.

When the operator of the wheel loader 1 performs an operation of the steering 3 and a lifting operation of the lift arm 21 (the working device 2) simultaneously, the hydraulic pump 41 supplies the hydraulic oil to each of the steering drive circuit 43 and the working device drive circuit 44. In this case, in order to ensure a flow rate of the hydraulic oil required for driving the steering 3 and a flow rate of the hydraulic oil required for driving the lift arm 21, it is necessary to increase rotational speed of the engine 40.

However, as previously described, when the wheel loader 1 performs the excavation and the loading work in a narrow and limited worksite, the hydraulic pump 41 must supply the hydraulic oil to each of the steering drive circuit 43 and the working device drive circuit 44 without increasing the rotational speed of the engine 40, in other words, with driving the engine at low idle.

However, since the wheel loader 1 is provided with the priority circuit 45, the hydraulic oil discharged from the hydraulic pump 41 is supplied to the steering drive circuit 43 preferentially over the working device drive circuit 44. Accordingly, there is a possibility that the flow rate of the hydraulic oil required for the lifting operation of the lift arm 21 cannot be secured.

In view of the above, in the wheel loader 1, the controller 5 is configured to control the pair of solenoid control valves 34A, 34B to limit a flow rate of the hydraulic oil to be supplied to the pair of steering cylinders 31, 32, thereby securing the flow rate of the hydraulic oil required for the lifting operation of the working device 2. In this connection, as illustrated in FIG. 4, the rotational speed of the engine 40 detected by a rotational speed sensor 400 is input to the controller 5.

(Configuration of Controller 5)

Next, the configuration of the controller 5 will be described with reference to FIG. 5 to FIG. 7.

FIG. 7 is a functional block diagram illustrating functions of the controller 5.

The controller 5 is configured by a CPU, a RAM, a ROM, an HDD, an input I/F, and an output I/F which are connected to each other via a bus. Various operation devices such as the steering lever 30 and various sensors such as the rotational speed sensor 400 and the angle sensor 61 are connected to the input I/F. The right steering solenoid control valve 34A, the left steering solenoid control valve 34B, etc. are connected to the output I/F.

In this hardware configuration, the CPU reads out a control program (software) stored in a recording medium such as the ROM, the HDD, or an optical disk, expands it on the RAM, and executes the expanded control program. Thereby, the control program and the hardware are operated in cooperation, which realizes the functions of the controller 5.

In the present embodiment, the controller 5 is described by a combination of software and hardware. Meanwhile, the present invention is not limited thereto, but an integrated circuit that realizes the functions of a control program executed on the side of the wheel loader 1 may be used.

Figure 5:
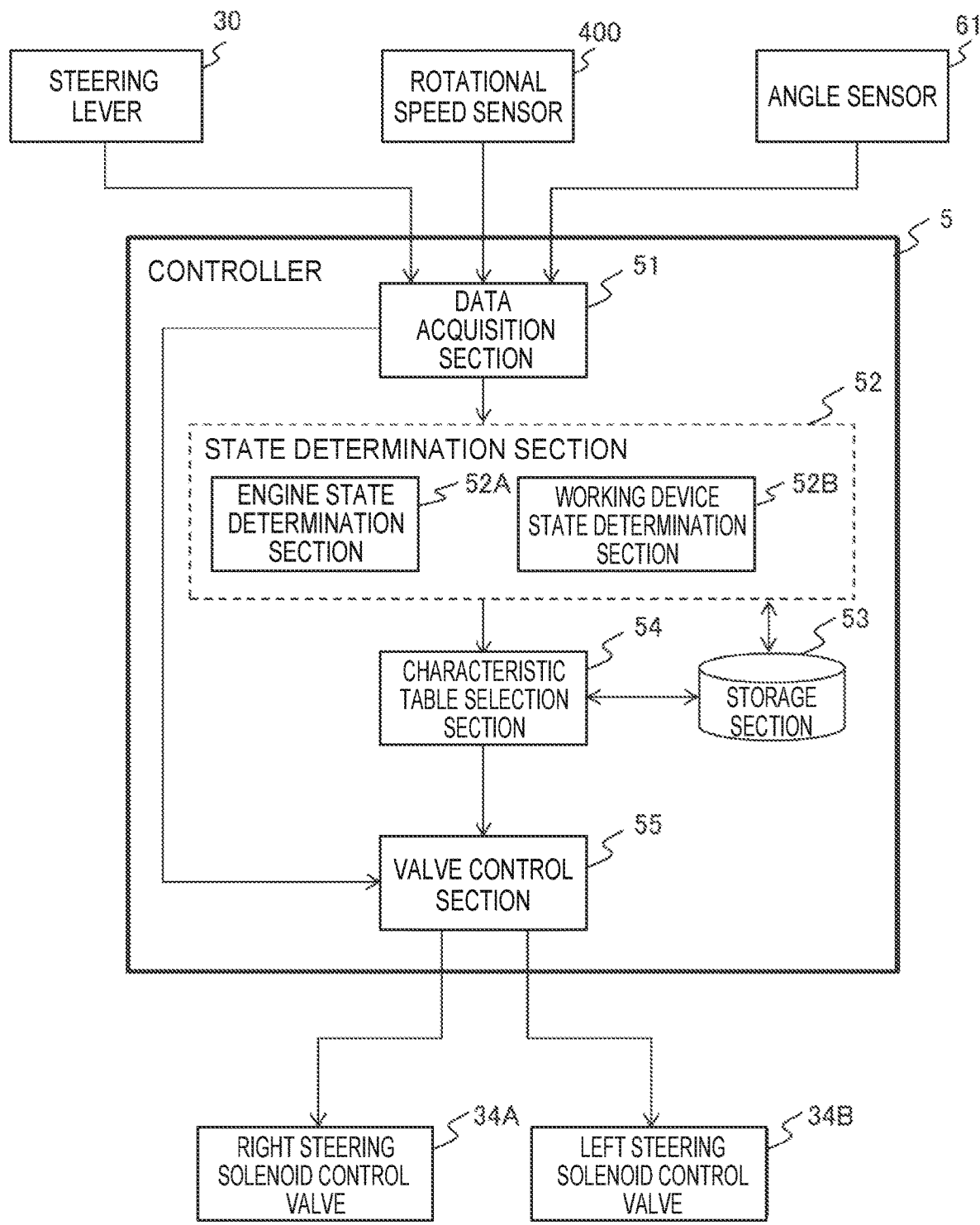
FIG. 5 is a functional block diagram illustrating functions of a controller.

As illustrated in FIG. 5, the controller 5 includes a data acquisition section 51, a state determination section 52, a storage section 53, a characteristic table selection section 54, and a valve control section 55.

The data acquisition section 51 acquires data relating to an operation signal (operation direction and operation angle θ) output from the steering lever 30, rotational speed N of the engine 40 (hereinafter, referred to as "engine rotational speed N") detected by the rotational speed sensor 400, and an operation angle α of the lift arm operation lever 210 detected by the angle sensor 61, respectively. In the present embodiment, the controller 5 executes processing by using only a detected value detected by the angle sensor 61 among detected values detected by the angle sensor 61 and the pilot pressure sensor 62 which serve as an operation state sensor.

The state determination section 52 includes an engine state determination section 52A and a working device state determination section 52B.

The engine state determination section 52A determines whether the engine 40 is driven in a low idle state based on the engine rotational speed N acquired by the data acquisition section 51. Here, the "low idle state" refers to a drive state of the engine 40 when the hydraulic pump 41 can supply the hydraulic oil to each of the pair of steering cylinders 31, 32 and the lift arm cylinder 21 at minimum. In addition, a case where the engine 40 is driven in a state of not being in the "low idle state" is referred to as a "normal state."

Specifically, the engine state determination section 52A determines whether the engine rotational speed N detected by the rotational speed sensor 400 is equal to or less than a predetermined rotational speed threshold Nth. Here, the "predetermined rotational speed threshold Nth" is a value set as the engine rotational speed when the engine 40 is driven in the low idle state.

When the engine state determination section 52A determines that the engine rotational speed N is equal to or less than the predetermined rotational speed threshold Nth (N≤Nth), the engine 40 is in the low idle state. When the engine state determination section 52A determines that the engine rotational speed N is greater than the predetermined rotational speed threshold Nth (N>Nth), the engine 40 is in the normal state.

The working device state determination section 52B determines, based on the operation angle α of the lift arm operation lever 210 acquired by the data acquisition section 51, whether the lift arm 21 is performing the lifting operation. Specifically, the working device state determination section 52B determines whether the operation angle α of the lift arm operation lever 210 detected by the angle sensor 61 is equal to or greater than a predetermined operation angle threshold αth. Here, the "predetermined operation angle threshold αth" is a value set as an operation angle of the lift arm operation lever 210 when the lift arm 21 starts the lifting operation.

The storage section 53 stores the predetermined rotational speed threshold Nth, the predetermined operation angle threshold αth, and a first characteristic table T1 and a second characteristic table T2 relating to operation speed V of the steering 3. The details of the first characteristic table T1 and the second characteristic table T2 will be described later.

The characteristic table selection section 54 reads the first characteristic table T1 and the second characteristic table T2 stored in the storage section 53 based on a determination result by the state determination section 52, and selects one of the characteristic tables.

Specifically, the characteristic table selection section 54 selects the first characteristic table T1 when the engine state determination section 52A determines that the engine 40 is driven in the normal state, while selecting the second characteristic table T2 when the engine state determination section 52A determines that the engine 40 is driven in the low idle state and when the working device state determination section 52B determines that the lift arm 21 is performing the lifting operation.

Based on the characteristic table selected by the characteristic table selection section 54, the valve control section 55 adjusts the operation speed V of the steering 3 by controlling the pair of solenoid control valves 34A, 34B. Specifically, when the characteristic table selection section 54 selects the second characteristic table T2, the valve control section 55 outputs a control signal (output current) to the pair of solenoid control valves 34A, 34B so as to limit the operation speed V of the steering 3 within a range which is greater than operation speed Vs at the start of the operation of the steering 3 and smaller than the operation speed of the steering 3 according to the first characteristic table T1.

As described above, by controlling the pair of solenoid control valves 34A, 34B, a flow rate of the hydraulic oil to be supplied to the pair of steering cylinders 31, 32 is adjusted. As a result, it is possible to control the operation speed V of the steering 3.

Here, the first characteristic table T1 and the second characteristic table T2 relating to the operation speed V of the steering 3 will be specifically described with reference to FIG. 6 and FIG. 7.

Figure 6B:
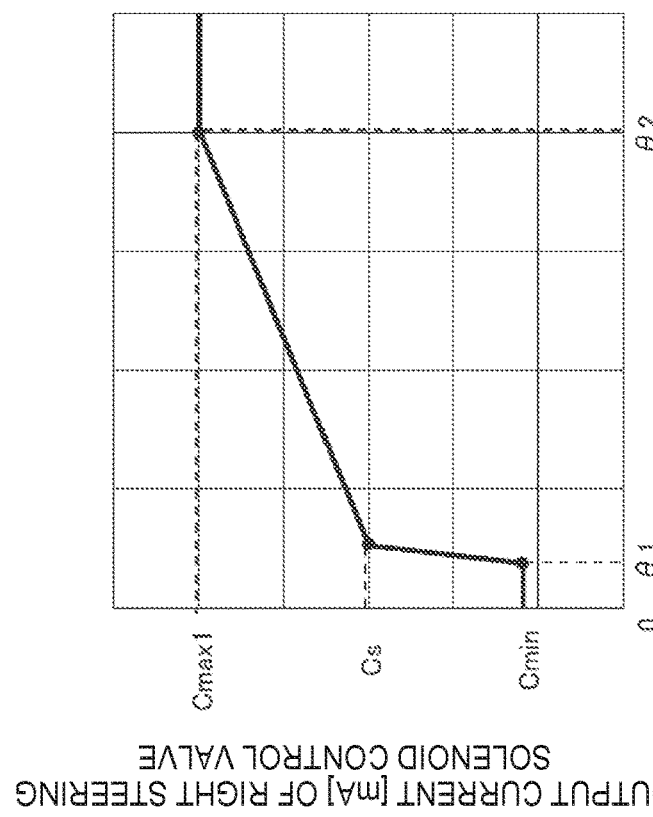
FIG. 6A and FIG. 6B illustrate relationship between an operation angle of a steering lever in a normal state and an output current to a pair of solenoid control valves (first characteristic table), specifically.
Figure 6A:
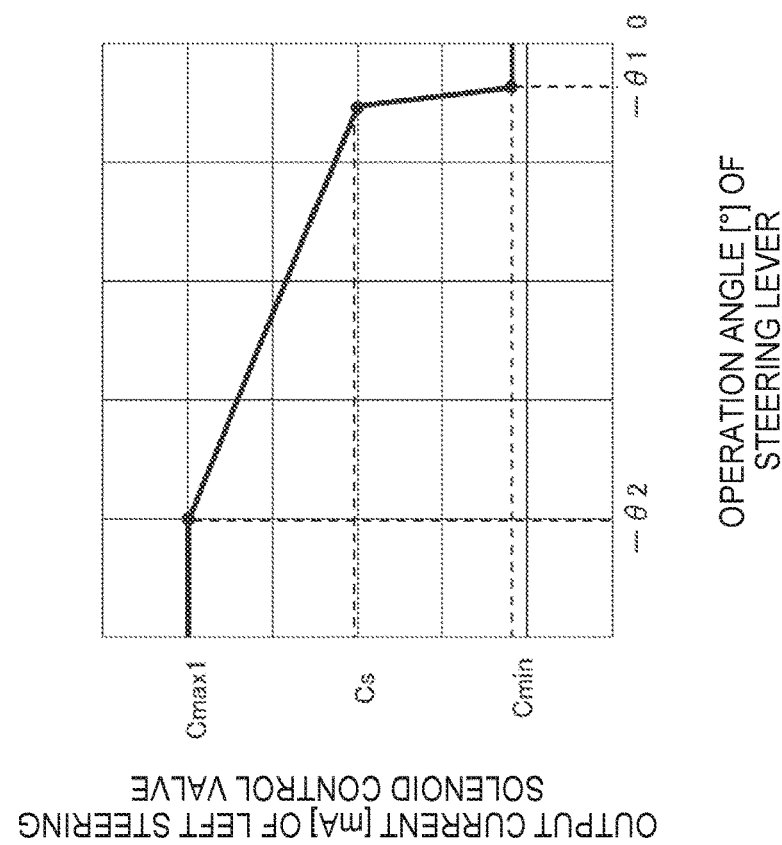
Figure 7A:
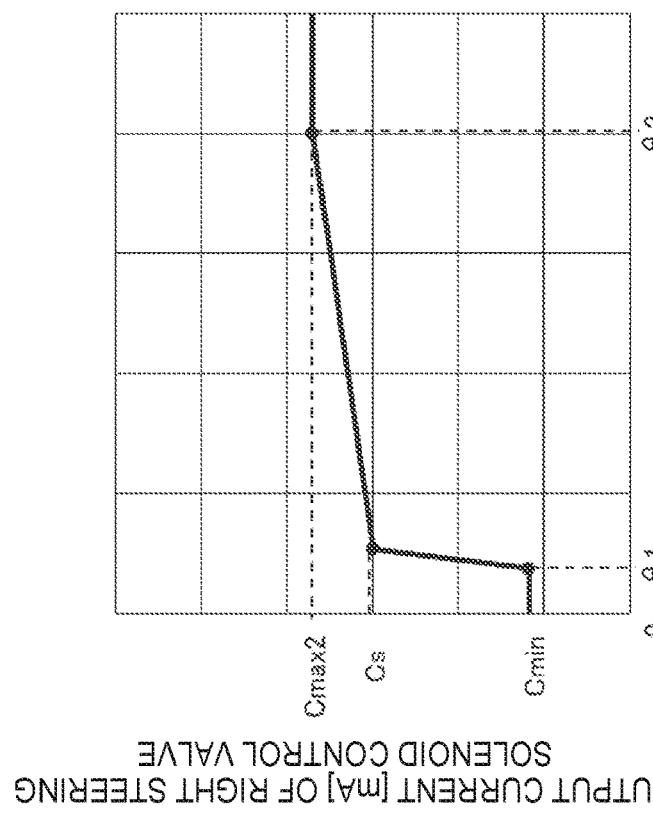
FIG. 7A and FIG. 7B illustrate relationship between an operation angle of a steering lever in a limited state and an output current to a pair of solenoid control valves (second characteristic table), specifically.
Figure 7B:
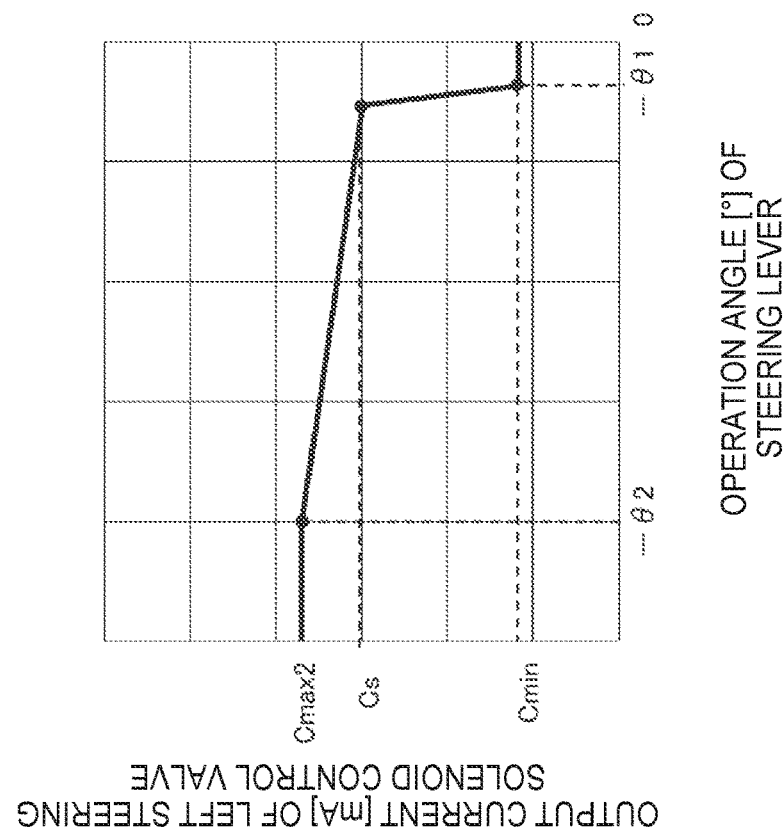

FIG. 6A and FIG. 6B illustrate relationship between the operation angle θ of the steering lever 30 in the normal state and the output current to the pair of solenoid control valves 34A, 34B (first characteristic table T1). Specifically, FIG. 6A illustrates a characteristic for left steering, and FIG. 6B illustrates a characteristic for right steering. FIG. 7A and FIG. 7B illustrate relationship between the operation angle θ of the steering lever 30 in the limited state and the output current to the pair of solenoid control valves 34A, 34B (second characteristic table T2). Specifically, FIG. 7A illustrates a characteristic for left steering, and FIG. 7B illustrates a characteristic for right steering.

In FIG. 6 and FIG. 7, the characteristic for right steering and the characteristic for left steering are symmetrical about when the operation angle θ of the steering lever 30 is 0° (θ=0°). In the following, the characteristic for right steering in which the operation angle θ of the steering lever 30 takes a positive value (see FIG. 6B and FIG. 7B) will be described as an example.

The "first characteristic table T1" is a table relating to the operation speed V of the steering 3, which corresponds to a case where the engine 40 is driven in the normal state. The first characteristic table T1 corresponds to the relationship between the operation angle θ of the steering lever 30 and the output current to the pair of solenoid control valves 34A, 34B illustrated in FIG. 6A and FIG. 6B.

As illustrated in FIG. 6B, when the operation angle θ of the steering lever 30 is in a range of 0 to θ1 (0≤θ≤θ1), an output current value C (hereinafter, simply referred to as "output current value C") to the right steering solenoid control valve 34A is constant at a minimum value Cmin (C=Cmin) regardless of the size of the operation angle θ of the steering lever 30 (dead zone).

When the operation angle θ of the steering lever 30 reaches an operation angle θ1 (θ=θ1), the output current value C instantly increases from the minimum value Cmin to a predetermined value Cs. The "predetermined value Cs" is an output current value associated with the operation speed Vs at the start of the operation of the steering 3. Accordingly, when the output current value C becomes the predetermined value Cs (C=Cs), the steering 3 starts to be activated so as to steer the wheels 11A, 11B to the right.

After the output current value C becomes the predetermined value Cs, the output current value C increases as the operation angle θ of the steering lever 30 increases. When the operation angle θ of the steering lever 30 reaches an operation angle θ2 (θ=θ2), the output current value C becomes a maximum value Cmax1 (C=Cmax1). In a range in which the operation angle θ of the steering lever 30 is equal to or greater than θ2 (θ≥θ2), the output current value C is constant at a maximum value Cmax1 regardless of the size of the operation angle θ of the steering lever 30 (C=Cmax1).

As described above, in the first characteristic table T1, the output current value C increases from the predetermined value Cs to the maximum value Cmax1 in proportion to the operation angle θ of the steering lever 30, and the operation speed V of the steering lever 3 increases from the operation speed Vs at the time of the start of the operation to the operation speed Vmax1 corresponding to the maximum value Cmax1.

In contrast, the "second characteristic table T2" is a table relating to the operation speed V of the steering 3, which corresponds to a case where the engine 40 is driven in the low idle state and the lift arm 21 is performing a lifting operation. The second characteristic table T2 corresponds to the relationship between the operation angle θ of the steering lever 30 and the output current to the pair of solenoid control valves 34A, 34B illustrated in FIG. 7A and FIG. 7B.

Similar to the first characteristic table T1, in the second characteristic table T2, in the range in which the operation angle θ of the steering lever 30 is 0 to θ1 (0≤θ≤θ1), the output current value C is constant at the minimum value Cmin (C=Cmin) (dead zone). When the operation angle θ of the steering lever 30 reaches the operation angle θ1 (θ=θ1), the output current value C instantly increases from the minimum value Cmin to a predetermined value Cs, and thereafter, the output current value C increases as the operation angle θ of the steering lever 30 increases.

On the other hand, as illustrated in FIG. 7B, the second characteristic table T2 differs from the first characteristic table T1 in that when the operation angle θ of the steering lever 30 reaches the operation angle θ2 (θ=θ2), the output current value C becomes a maximum value Cmax2 (C=Cmax2). The maximum value Cmax2 is an output current value smaller than the maximum value Cmax1 in the first characteristic table T1 (Cmax2<Cmax1).

When the steering lever 30 is operated and the steering 3 starts to be activated, in a case where the characteristic table selection section 54 selects the first characteristic table T1, the controller 5 controls the operation speed V of the steering 3 by adjusting the output current value C to a value corresponding to the operation angle θ of the steering lever 30 within a range from the predetermined value Cs to the maximum value Cmax1. In a case where the characteristic table selection section 54 selects the second characteristic table T2, the controller 5 controls the operation speed V of the steering 3 by adjusting the output current value C to a value corresponding to the operation angle θ of the steering lever 30 within a range from the predetermined value Cs to the maximum value Cmax2.

Comparing FIG. 6B and FIG. 7B, in the second characteristic table T2, an inclination of a graph in a range in which the operation angle θ of the steering lever 30 is greater than the operation angle θ1 and equal to or smaller than θ2 (θ1<θ≤θ2) is gentler than an inclination of a graph in the same range of the first characteristic table T1.

As described above, when the characteristic table selection section 54 selects the second characteristic table T2 and the characteristic table is switched from the first characteristic table T1 to the second characteristic table T2, the output current C is limited within a range of greater than the predetermined value Cs and smaller than the maximum value Cmax1 of the first characteristic table T1 (Cs<C<Cmax1).

With this configuration, based on the second characteristic table T2, the controller 5 controls the output current to be output from the pair of solenoid control valves 34A, 34B so that the engine 40 is driven in the low idle state and the operation speed V of the steering 3 is limited. Accordingly, the hydraulic oil discharged from the hydraulic pump 41 can be supplied to the working device drive circuit 44, thereby making it possible to secure a flow rate of the hydraulic oil required for the lifting operation of the lift arm 21. Therefore, even when the wheel loader 1 includes the priority circuit 45, without needing costly means such as providing additional hydraulic pumps, it is possible to improve work efficiency by increasing the operation speed of the lift arm 21.

(Processing by Controller 5)

Next, a specific flow of processing executed by the controller 5 will be described with reference to FIG. 8.

Figure 8:
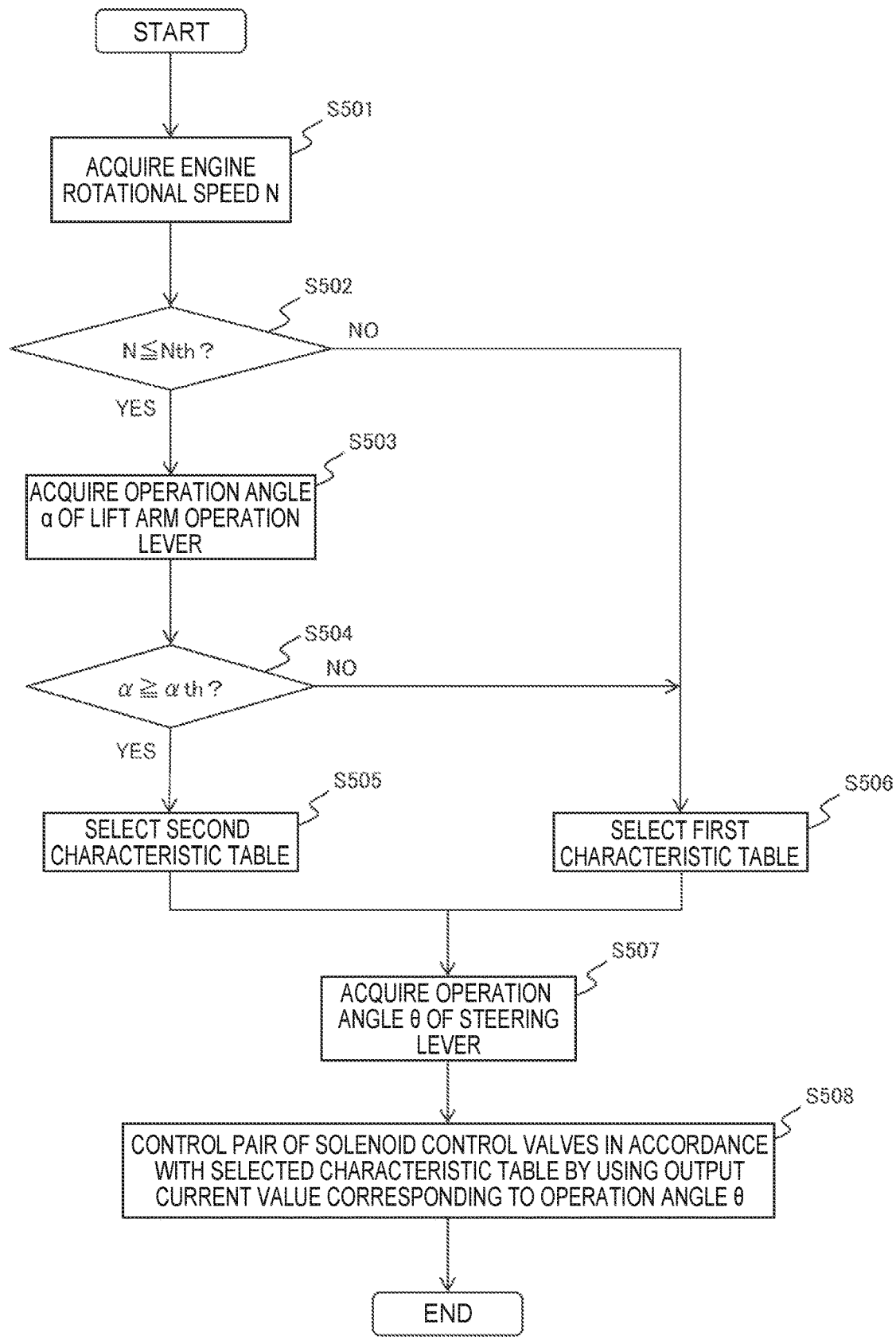
FIG. 8 illustrates a flowchart showing a flow of processing executed by a controller.

FIG. 8 illustrates a flowchart showing a flow of processing executed by the controller 5.

First, the data acquisition section 51 acquires the engine rotational speed N output from the rotational speed sensor 400 (step S501). Next, the engine state determination section 52A determines whether the engine rotational speed N acquired in step S501 is equal to or less than the predetermined rotational speed threshold Nth (step S502).

When it is determined in step S502 that the engine rotational speed N is equal to or less than the predetermined rotational speed threshold Nth (N≤Nth) (step S502/YES), the data acquisition section 51 acquires the operation angle α of the lift arm operation lever 210 output from the angle sensor 61 (step S503).

Next, the working device state determination section 52B determines whether the operation angle α of the lift arm operation lever 210 acquired in step S503 is equal to or greater than the predetermined operation angle threshold αth (step S504).

When it is determined in step S504 that the operation angle α of the lift arm operation lever 210 is equal to or greater than the predetermined operation angle threshold αth (α≥αth) (step S504/YES), the characteristic table selection section 54 selects the second characteristic table T2 (step S505).

On the other hand, when it is determined in step S502 that the engine rotational speed N is greater than the predetermined rotational speed threshold Nth (N>Nth) (step S502/

NO) and when it is determined in step S504 that the operation angle α of the lift arm operation lever 210 is smaller than the predetermined operation angle threshold αth (α<αth) (step S504/NO), the characteristic table selection section 54 selects the first characteristic table T1 (step S506).

Subsequently, the data acquisition section 51 acquires the operation angle θ based on the operation signal output from the steering lever 30 (step S507). Then, in accordance with the characteristic table selected in step S505 or step S506, the valve control section 55 controls the pair of solenoid control valves 34A, 34B by using the output current C corresponding to the operation angle θ of the steering lever 30 acquired in step S507 (step S508). Thereafter, the processing by the controller 5 is ended.

In the present embodiment, since the operation angle α of the lift arm operation lever 210 is used for determination as to whether the lift arm 21 is performing the lifting operation, it is possible to reduce erroneous determination of the lifting operation of the lift arm 21, for example, as compared with a case of using bottom pressure of the pair of lift arm cylinders 22L, 22R which is susceptible to pressure fluctuation due to vibration, etc. In this connection, in a case where pilot pressure generated in accordance with the operation angle α of the lift arm operation lever 210 is used for determination as to whether the lift arm 21 is performing the lifting operation, the same effect as above can be obtained.

Furthermore, in the present embodiment, the controller 5 makes the storage section 53 store the first characteristic table T1 which is a characteristic table in the normal state that does not limit the operation speed V of the steering 3, and the second characteristic table T2 which is a characteristic table in the limited state that limits the operation speed V of the steering 3. Then, when the state determination section 52 determines that the engine 40 is driven in the low idle state and the lift arm 21 is performing the lifting operation, the controller 5 switches from the first characteristic table T1 to the second characteristic table T2, so as to limit the operation speed V of the steering 3. With this configuration, the operation speed V is smoothly limited without suddenly changing, and accordingly, it is possible to widen an adjustment range of the operation speed V, which makes it easy for the operator to adjust the operation speed V.

(Modification)

Next, a modification of the wheel loader 1 according to the embodiment of the present invention will be described with reference to FIG. 9. In FIG. 9, components common to those described for the wheel loader 1 according to the embodiment are provided with the same reference signs, and explanation thereof will be omitted.

Figure 9B:
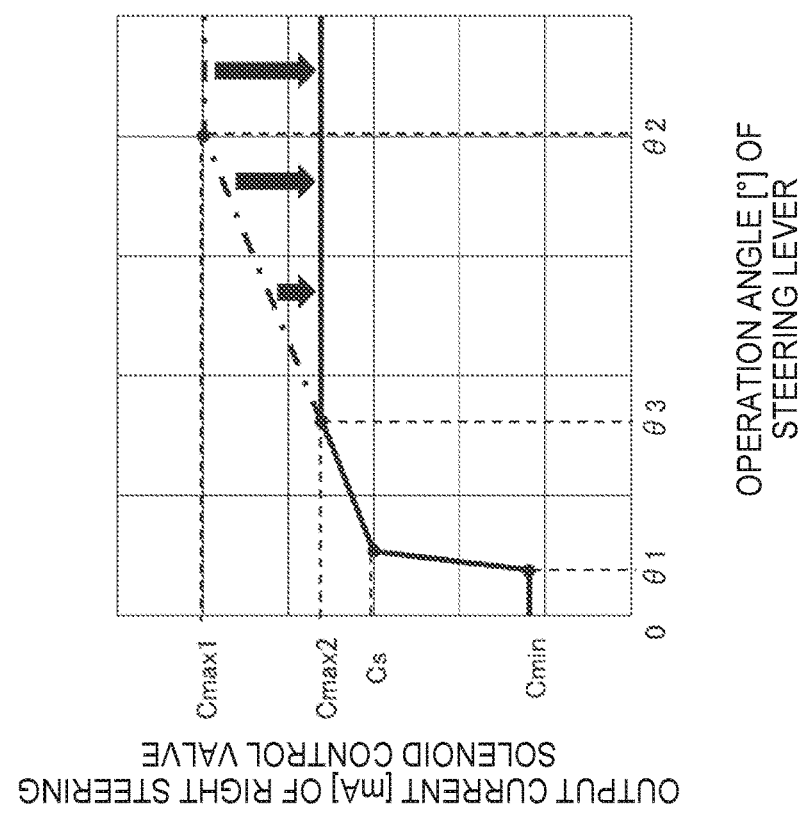
FIG. 9A and FIG. 9B illustrate relationship between an operation angle of a steering lever and an output current to a pair of solenoid control valves according to a modification of the present invention, specifically.
Figure 9A:
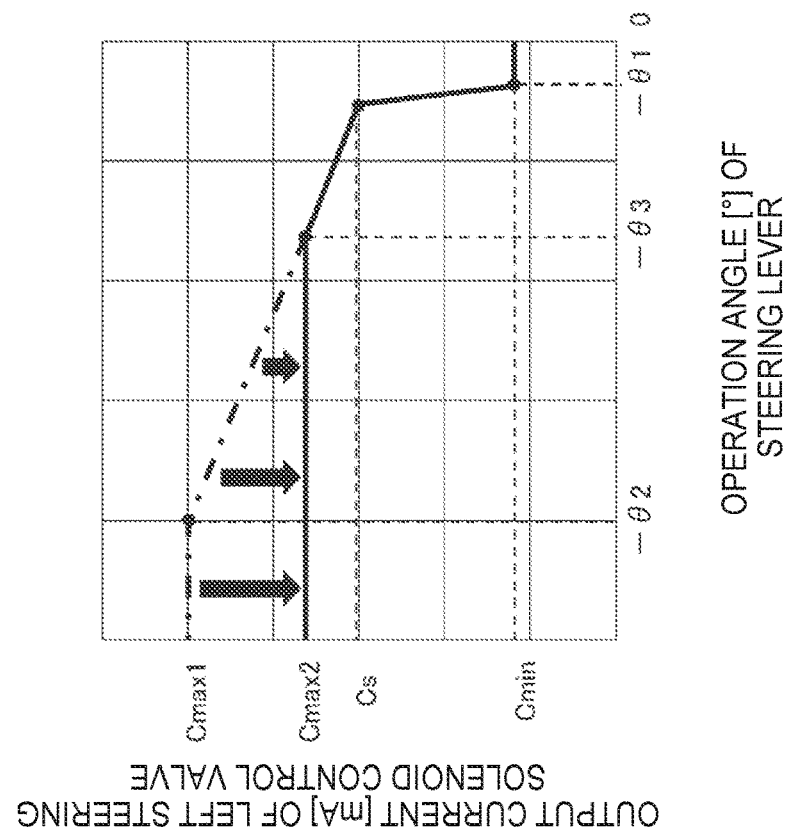

FIG. 9A and FIG. 9B illustrate relationship between the operation angle θ of the steering lever 30 and the output current to the pair of solenoid control valves 34A, 34B according to the present modification. FIG. 9A illustrates a characteristic for left steering, and FIG. 9B illustrates a characteristic for right steering.

The controller 5 according to the present modification differs from the controller 5 according to the embodiment described above in that the storage section 53 does not store the second characteristic table T2. Accordingly, although, in the embodiment described above, the characteristic table selection section 54 selects one of the first characteristic table T1 and the second characteristic table T2, the controller 5 according to the present modification does not include the characteristic table selection section 54.

Specifically, the controller 5 according to the present modification makes the storage section 53 store the maximum value Cmax2 of the output current, which is for a case of limiting the operation speed V of the steering 3. When the state determination section 52 determines that the engine 40 is driven in the low idle state and the lift arm 21 is performing the lifting operation, the valve control section 55 limits the maximum value of the output current in the first characteristic table T1 from Cmax1 to Cmax2 which is smaller than Cmax1 (<Cmax1).

The maximum value Cmax2 of the output current in the limited state is a predetermined value which is smaller than the maximum value Cmax1 of the output current in the normal state and greater than the output current value Cs corresponding to the operation speed Vs at the time of start of the operation of the steering 3 (Cs<Cmax2<Cmax1).

As illustrated in FIG. 9B, the controller 5 controls the right steering solenoid control valve 34A in accordance with the first characteristic table T1 in the normal state, and limits the maximum value of the output current in the first characteristic table T1 from Cmax1 to Cmax2 in the limited state.

With this configuration, in a range where the operation angle θ of the steering lever 30 is equal to or greater than an operation angle θ3 of the steering lever 30 (θ03) which corresponds to a case where the output current value is Cmax2, the controller 5 controls the output current value to be constant at Cmax2 regardless of the size of the operation angle θ of the steering lever 30.

In the same manner as the embodiment described above, the present modification is also configured to limit the output current to be output from the pair of solenoid control valves 34A, 34B so as to drive the engine 40 in the low idle state and limit the operation speed of the steering 3. With this configuration, even when the wheel loader 1 includes a priority circuit 45, the hydraulic oil discharged from the hydraulic pump 41 can be supplied to the working device drive circuit 44, thereby making it possible to secure the flow rate of the hydraulic oil required for the lifting operation of the lift arm 21.

In the above, the embodiment of the present invention has been described. It should be noted that the present invention is not limited to the embodiment and modification described above, and various other modifications are included. For example, the embodiments described above have been explained in detail in order to clarify the present invention, but are not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, in the above-descried embodiment and modification, the wheel loader has been described as an aspect of a working vehicle. Meanwhile, the present invention is not limited thereto, but may be applied to, for example, a forklift, etc.

Furthermore, in the above-described embodiment and modification, the controller 5 performs determination of the lifting operation of the lift arm 21 by using the operation angle α of the lift arm operation lever 210 detected by the angle sensor 61. Meanwhile, the present invention is not limited thereto, but the pilot pressure detected by the pilot pressure sensor 62 may be used, or both the operation angle α of the lift arm operation lever 210 and the pilot pressure may be used.

REFERENCE SIGNS LIST

- 1: wheel loader (working vehicle)
- 2: working device
- 3: steering
- 5: controller
- 11A: front wheel
- 11B: rear wheel
- 22L, 22R: lift arm cylinder (working device cylinder)
- 24: bucket cylinder (working device cylinder)
- 30: steering lever (steering operation device)
- 31: left steering cylinder
- 32: right steering cylinder
- 33: steering directional control valve
- 34A: right steering solenoid control valve
- 34B: left steering solenoid control valve
- 40: engine
- 41: hydraulic pump
- 61: angle sensor (operation state sensor)
- 62: pilot pressure sensor (operation state sensor)
- 210: lift arm operation lever (working device operation device)
- 230: bucket operation lever (working device operation device)
- 400: rotational speed sensor
- 451: priority valve
- T1: first characteristic table
- T2: second characteristic table

The invention claimed is:

1. A working vehicle comprising:
    an engine;
    a working device provided in a front portion of a vehicle body and rotatable in a vertical direction;
    a working device cylinder configured to activate the working device;
    a working device operation device configured to operate the working device;
    a steering configured to steer wheels;
    a steering cylinder configured to activate the steering;
    a hydraulic pump configured to be driven by the engine and supply hydraulic oil to each of the working device cylinder and the steering cylinder;
    a steering directional control valve configured to control a flow of the hydraulic oil supplied to the steering cylinder; and
    a priority valve configured to allow the hydraulic oil discharged from the hydraulic pump to the steering cylinder preferentially over the working device cylinder,
    wherein the working vehicle further comprises:
       an electric steering operation device configured to operate the steering;
       a solenoid control valve configured to control the steering directional control valve in accordance with an operation amount of the steering operation device;
       a rotational speed sensor configured to detect rotational speed of the engine;
       an operation state sensor configured to detect an operation state of the working device operation device; and
       a controller configured to output an output current in accordance with the operation amount of the steering operation device to the solenoid control valve so as to control the solenoid control valve, and
    wherein the controller is further configured to:
       based on the rotational speed of the engine detected by the rotational speed sensor, determine whether the engine is driven in a low idle state in which the hydraulic pump can supply the hydraulic oil to each of the steering cylinder and the working device cylinder at minimum;
       based on the operation state of the working device operation device detected by the operation state sensor, determine whether the working device is performing a lifting operation; and
       in a case of determining that the engine is driven in the low idle state and the working device is performing the lifting operation, limit the output current to be output to the solenoid control valve so that an operation speed of the steering is limited.

2. The working vehicle according to claim 1, wherein the controller is further configured to:
    store a first characteristic table relating to the operation speed of the steering which corresponds to a case where the engine is driven in a normal state that is not the low idle state, and a second characteristic table relating to the operation speed of the steering which corresponds to a case where the engine is driven in the low idle state and the working device is performing the lifting operation; and
    in a case of determining that the engine is driven in the low idle state and the working device is performing the lifting operation, switch from the first characteristic table to the second characteristic table, and limit the output current to be output to the solenoid control valve based on the switched second characteristic table.

3. The working vehicle according to claim 1, wherein the operation state sensor is a pilot pressure sensor configured to detect pilot pressure generated in accordance with an operation amount of the working device operation device.

4. The working vehicle according to claim 1, wherein the operating state sensor is an angle sensor configured to detect an operation angle of the working device operation device.

* * * * *